United States Patent
Smith et al.

(10) Patent No.: US 7,770,360 B2
(45) Date of Patent: Aug. 10, 2010

(54) FORM FILL AND SEAL CONTAINER

(75) Inventors: Mark A. Smith, Plainfield, IL (US); Christopher C. Rutter, Oakland, CA (US)

(73) Assignee: DS Smith Plastics Limited, Maidenhead (GB)

( * ) Notice: Subject to any disclaimer, the term of this patent is extended or adjusted under 35 U.S.C. 154(b) by 910 days.

(21) Appl. No.: 11/294,323

(22) Filed: Dec. 5, 2005

(65) Prior Publication Data

US 2007/0127854 A1    Jun. 7, 2007

(51) Int. Cl.
  *B65B 61/00*    (2006.01)
  *B31B 1/84*    (2006.01)
(52) U.S. Cl. .......................... 53/410; 53/133.2; 493/213
(58) Field of Classification Search .................. 53/410, 53/469, 133.2; 493/213; 383/66, 103, 906
  See application file for complete search history.

(56) References Cited

U.S. PATENT DOCUMENTS

| 3,244,576 | A | * | 4/1966 | Swartz ........................ 383/66 |
| 3,306,327 | A | * | 2/1967 | Ilg ............................... 383/66 |
| 3,381,887 | A | * | 5/1968 | Lowry ........................ 493/213 |
| 3,894,381 | A | | 7/1975 | Christine et al. |
| 4,055,032 | A | | 10/1977 | Hammond |
| 4,286,636 | A | | 9/1981 | Credle |
| 4,421,296 | A | | 12/1983 | Stephens |
| 4,445,539 | A | | 5/1984 | Credle |
| 4,483,464 | A | | 11/1984 | Nomura |
| 4,512,136 | A | | 4/1985 | Christine |
| 4,519,184 | A | | 5/1985 | Brunswick |
| 4,566,250 | A | | 1/1986 | Matsumura et al. |
| 4,640,838 | A | * | 2/1987 | Isakson et al. ............. 383/103 |
| 4,672,688 | A | * | 6/1987 | Kalkipsakis ................ 383/66 |
| 4,700,744 | A | | 10/1987 | Rutter et al. |
| 4,709,528 | A | | 12/1987 | Merkus |
| 4,819,839 | A | | 4/1989 | Carlsson et al. |
| 4,830,273 | A | | 5/1989 | Kalberer et al. |
| 4,887,912 | A | * | 12/1989 | Stumpf ........................ 383/66 |
| 4,951,710 | A | | 8/1990 | Kotake |
| 5,046,645 | A | | 9/1991 | Hagan et al. |
| 5,145,083 | A | | 9/1992 | Takahashi |
| 5,152,438 | A | | 10/1992 | Gordon et al. |
| 5,156,295 | A | | 10/1992 | Gordon et al. |

(Continued)

FOREIGN PATENT DOCUMENTS

EP    0087828    2/1982

(Continued)

*Primary Examiner*—Louis K Huynh
(74) *Attorney, Agent, or Firm*—Rockey, Depke & Lyons, LLC

(57) ABSTRACT

A flexible container and a method of manufacturing the same where a spout or fitment is attached to the outside of the flexible container. The flexible container includes a patch having at least a portion of the patch overlapping an opening of the flexible container. The fitment is attached to the outside of the sidewall of the container and the portion of the patch which overlaps the opening of the flexible container. The fitment includes a flange with a bottom surface having sealing beads. The sealing beads can be bonded to the outside of the sidewall of the container and/or the portion of the patch which overlaps the opening of the flexible container.

31 Claims, 3 Drawing Sheets

U.S. PATENT DOCUMENTS

| | | | |
|---|---|---|---|
| 5,255,713 A | 10/1993 | Scholle et al. | |
| 5,325,983 A | 7/1994 | Imai et al. | |
| 5,462,255 A | 10/1995 | Rosen et al. | |
| 5,498,225 A | 3/1996 | Nedstedt | |
| 5,584,409 A * | 12/1996 | Chemberlen | 383/103 |
| 5,785,212 A | 7/1998 | Steiger | |
| 5,851,072 A | 12/1998 | LaFleur | |
| 5,884,648 A | 3/1999 | Savage | |
| 6,090,029 A | 7/2000 | LaFleur | |
| 6,126,045 A | 10/2000 | Last | |
| 6,131,767 A | 10/2000 | Savage et al. | |
| 6,347,785 B1 | 2/2002 | Copp et al. | |
| 6,581,357 B1 | 6/2003 | Lindenberger | |
| 6,607,097 B2 * | 8/2003 | Savage et al. | 222/1 |
| 6,695,757 B2 | 2/2004 | Edwards et al. | |
| 6,746,388 B2 | 6/2004 | Edwards et al. | |
| 6,783,277 B2 | 8/2004 | Edwards et al. | |
| 6,786,252 B2 | 9/2004 | Erb et al. | |
| 6,827,492 B2 * | 12/2004 | Cook | 383/103 |
| 6,851,579 B2 | 2/2005 | Savage et al. | |
| 6,983,845 B2 * | 1/2006 | Shah et al. | 383/103 |
| 7,244,223 B2 * | 7/2007 | Hartman et al. | 493/213 |
| 2004/0065056 A1 | 4/2004 | Wilford et al. | |
| 2004/0206055 A1 * | 10/2004 | Schroeder et al. | 53/133.2 |
| 2005/0025398 A1 | 2/2005 | Edwards et al. | |
| 2006/0110077 A1 * | 5/2006 | Savage et al. | 383/66 |

FOREIGN PATENT DOCUMENTS

| | | |
|---|---|---|
| EP | 0432070 | 4/1990 |
| WO | WO 00/43268 | 7/2000 |

* cited by examiner

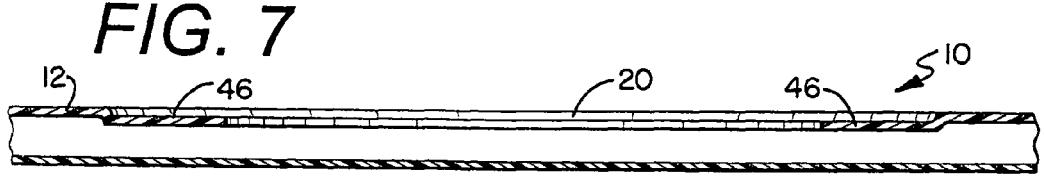
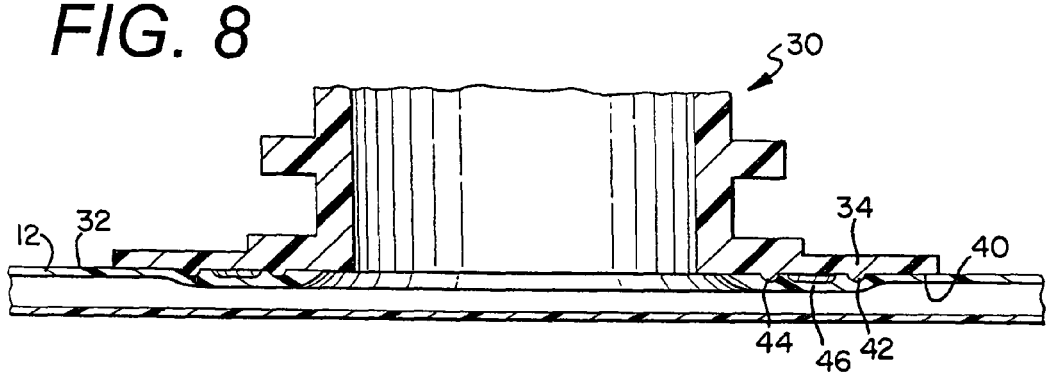
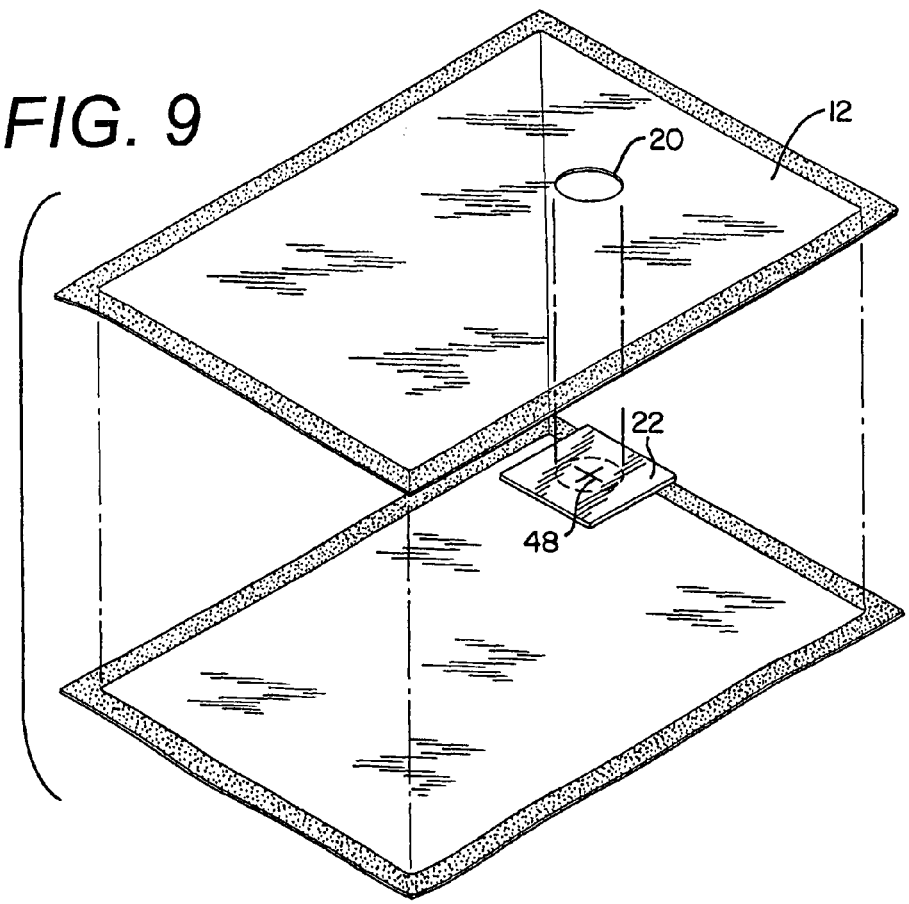

FORM FILL AND SEAL CONTAINER

TECHNICAL FIELD

The invention relates generally to flexible packaging and more specifically to form fill and seal packaging and methods for manufacturing the same.

BACKGROUND OF THE INVENTION

A number of flexible plastic containers are well known in the art for storing and dispensing wine, soft drink syrup, dairy products, enteral feeding solutions, fruit juices, tea and coffee concentrates, puddings, cheese sauces, cleaning chemicals and many other flowable materials. The flexible containers described above typically have walls fabricated from polymeric films having either a monolayer or multiple layer structure. The particular polymers constituting the container film layers will often vary depending upon the type of material to be placed in the container.

In some instances, the film layers may additionally include an oxygen barrier material layer to prevent contact between such materials and oxygen or other gas sensitive contents. In some applications, the walls of the containers may be metallized, or coated with a metallic layer such as aluminum to prevent incursion of oxygen or other gases. A separate metallized enclosure may also encase the polymeric container.

The flexible polymeric containers generally have inlets and/or spouts for filling and dispensing their contents. The spout typically includes a flange which is sealed to an inside surface of one of the walls of the container. In most applications, the containers are then placed within a corrugated box. The spout extends through an opening provided in the box to dispense the contents. Such packaging systems are commonly referred to as "bag-in-box" or BIB. Bag-in-box systems have enjoyed wide success in a number of industries, most notably for use in containing and dispensing soft drink syrup and other liquid products. Prior art examples of such systems are shown in U.S. Pat. Nos. 4,286,636; 4,601,410; 5,647,511; 5,749,493; and 6,607,097 the entire disclosures of which are incorporated herein by reference.

In a vast majority of applications, BIB bags are provided with a spout or fitment during the bag manufacturing process. As discussed above, the spout normally includes a flange that is heat sealed to an inside surface of the bag. The completed bags are packed and sent to a separate location where they are then fed into filling machines which uncap the bags and fill them with liquid. The filled bags are recapped and placed in a corrugated or other similar type box. The filled bags are then sent to commercial establishments where a pump is attached to the spout and the contents can be emptied.

One disadvantage of the presently used system is that the attachment of the spout or fitment during the bag manufacturing process is time consuming and limits the speed at which the bag manufacturing machines can operate. Moreover, bags with spouts attached are more difficult to pack for shipment to filling locations and take up significantly more space than bags without spouts. The above mentioned problems result in increased operating and freight costs to both bag manufacturers and bag purchasers.

The present invention provides advantages over the presently used system described above. A full discussion of the features and advantages of the present invention is provided below with reference to the accompanying drawings.

SUMMARY OF THE INVENTION

The present invention provides a method of manufacturing a flexible container where a spout or fitment can be attached to the outside of a wall of a flexible container. In the present invention because the spout can be attached to the outside of the flexible container, the flexible container can be manufactured without having to attach a spout during the manufacturing process. The spout can, therefore, be attached to the container at any point after the flexible container has been manufactured.

The present invention will give the manufacturers of the containers greater versatility in the manner in which the containers are manufactured and shipped. For example, in one embodiment of the present invention, bags for containing and dispensing fluids are manufactured without having any spouts attached. The bags are then shipped to a location where they will be filled, and it is at that filling location that the spouts are attached. In that example, the present invention will increase the rates at which the bags are being manufactured and will also make packing the bags for shipment easier than if the bags had already had spouts attached. The present invention will thus lower both the manufacturing and the freight costs associated with the bags.

In one embodiment of the present invention, a flexible container is formed by providing a first sidewall and a second sidewall. Each of the sidewalls has an inner and an outer surface with the first side wall having an opening therein. A patch is attached to the inner surface of the first sidewall of the container with the patch being sized so that a portion of the patch overlaps the opening in the first sidewall of the container. The first and second sidewalls are then sealed together to form a container. A fitment is provided which includes a flange having a top surface and a bottom surface. The bottom surface of the flange of the fitment is attached to both the outer surface of the first sidewall of the container and the portion of the flexible patch. It is in this manner that the fitment is able to be attached to the outside of the flexible container.

In another embodiment of the present invention, the fitment includes a flange having a sealing bead on the bottom surface which is bonded to the portion of the patch which overlaps the opening in the sidewall of the container when the fitment is attached to the outer surface of the flexible container and the portion of the patch.

In another embodiment of the present invention, the fitment includes a flange having two sealing beads on the bottom surface of the flange. One sealing bead is bonded to the portion of the patch which overlaps the opening in the sidewall and the other sealing bead is bonded to the outer surface of the container when the fitment is attached to the flexible container. The sealing beads enhance the ability for a fluid tight seal to formed between the bottom surface of the flange and the opening of the container.

Other embodiments of the present invention include multiple sealing beads which are bonded to the portion of the patch and/or to the outer surface of the container. The sealing beads of the fitment can also be bonded to only the outer surface of the wall of the container or to just the portion of the patch that overlaps the opening of the wall of the container.

Another function of bonding the patch and the container wall to the sealing beads is to prevent the patch and container wall from deteriorating. As described above, the container walls can have multiple layers which are laminated together. The present invention also includes embodiments wherein the patch will be manufactured by laminating multiple layers of material together. In some applications in which the container is used, the raw edges of the patch and container wall are exposed for extended periods of time to certain products which cause the multiple layers of either the patch or the container wall to delaminate. Attaching or bonding the patch and/or the container wall to the sealing beads prevents the patch and the container wall from delaminating.

In an embodiment of the present invention in which the patch includes multiple layers of material, the patch has an outer polyethylene layer and an inner polyester layer. Because polyester has a higher melting temperature than polyethylene, the polyethylene layer is able to be heat sealed to the flange or the first sidewall of the container while the polyester layer protects the second sidewall of the container during this process. In this manner, the patch can be heat sealed to the flange or first sidewall without adversely affecting the second sidewall of the container. It should be appreciated that the patch can be made of other materials than the two materials described above. The patch can also only consist of a single layer of material and can be attached by means other than heat sealing.

Another embodiment of the present invention includes providing an annular opening through the first sidewall, the annular opening having a lip or annular skirt with an inner and outer surface. The bottom surface of the flange can then be attached to both the outer surface of the wall of the container and the outer surface of the annular skirt.

A further embodiment of the present invention include a step of applying adhesive to the patch so that the second sidewall of the container is temporarily secured to the patch during handling and shipping of the container so that air or impurities do not enter into the container before the container is filled.

Other embodiments of the present invention, include a patch having an opening before it is attached to the sidewall of a container, a patch partially cut so that an opening is formed in the patch when the fitment is attached or the bag is being filled and/or an opening in the patch being formed when the fitment is attached or the bag is being filled.

Other features and advantages of the invention will be apparent from the following disclosure taken in conjunction with the following drawings.

BRIEF DESCRIPTION OF THE DRAWINGS

To understand the present invention, it will now be described by way of example, with reference to the accompanying drawings in which:

FIG. 7 is a cross section partial view of the flexible container having an opening, the opening having an annular skirt;

FIG. 8 is a cross sectional partial view of the flexible container having a fitment attached to an outer surface of a container wall and a skirt in the opening of the container wall, the fitment also includes sealing beads on the bottom surface of its flange that are attached to the outer surface of the container wall and to the annular skirt; and FIG. 9 is an exploded view of an embodiment of the present invention.

DETAILED DESCRIPTION

Figure 2:
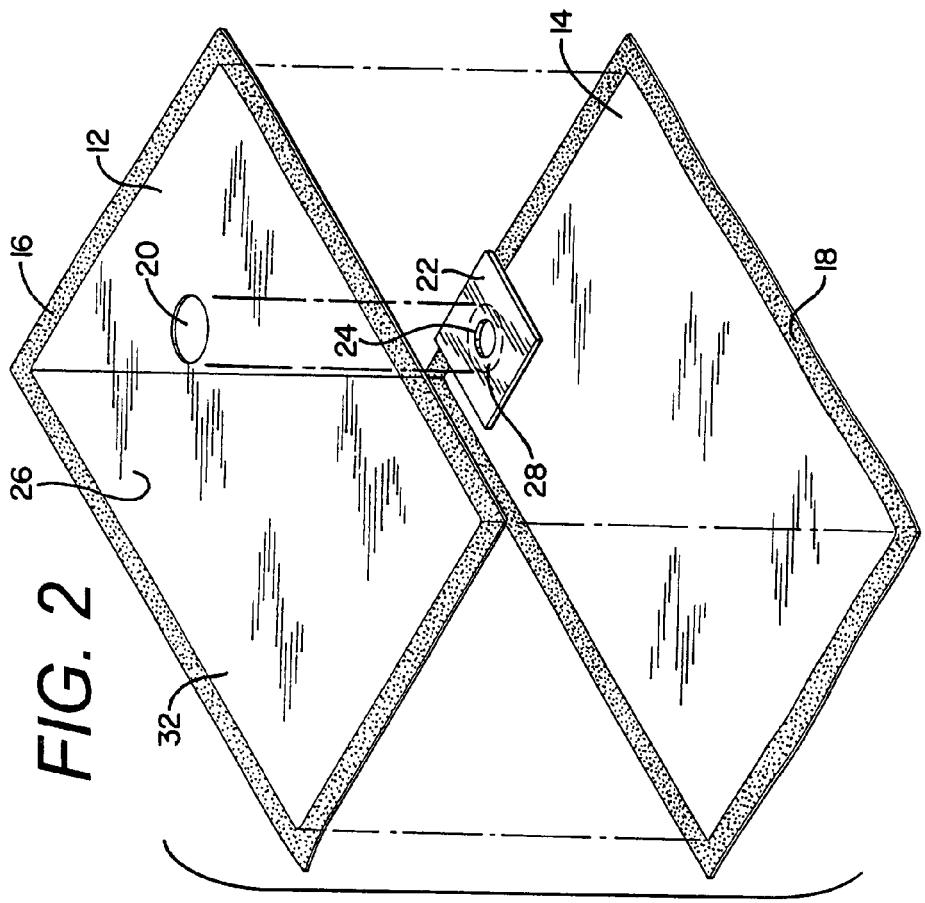
FIG. 2 is an exploded view of an embodiment of the present invention.

While this invention includes embodiments in many different forms, the embodiments shown in the drawings and which are described herein are preferred embodiments. The preferred embodiments are to be considered as exemplifications of the principles of the invention and are not intended to limit the broad aspect of the invention to the embodiments illustrated and described herein.

Figure 1:
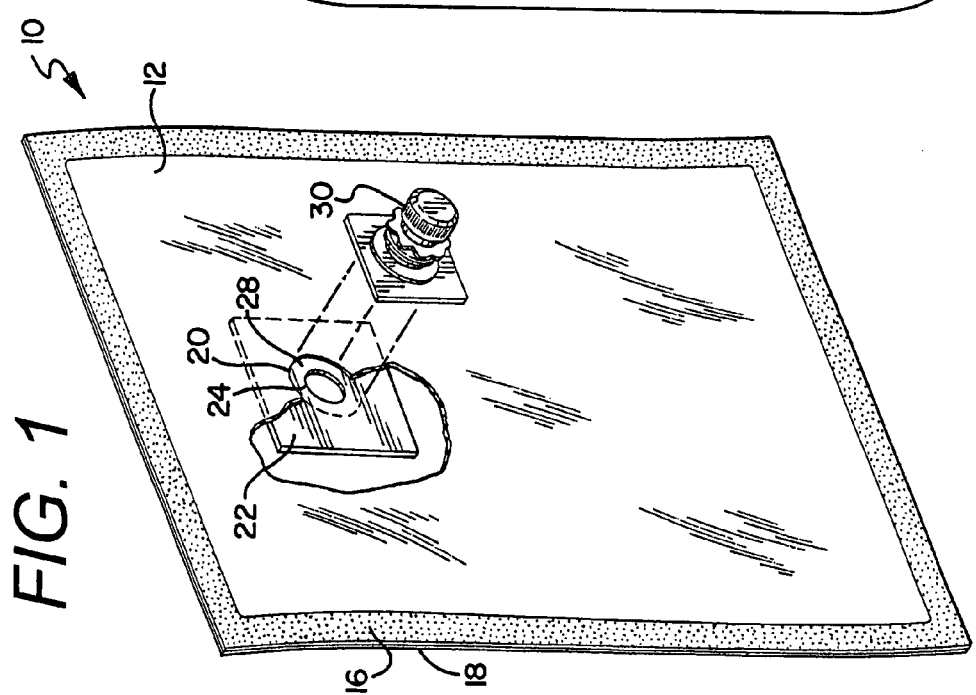
FIG. 1 is an isometric, partially cut away front side view of a flexible container according to the present invention.

The present invention is directed to a flexible container 10 which is used to contain and to dispense fluids. FIGS. 1 and 2 illustrate one embodiment of the present invention. The flexible container 10 includes a first sidewall 12 and a second sidewall 14 that are sealed together at the peripheries of each of the sidewalls 16 and 18. The sidewalls 12 and 14 are made of a thermoplastic material that can be sealed by means of heat sealing or by a suitable adhesive. The first sidewall 12 also includes an opening 20 to the interior of the container. While in this embodiment the opening is annular 20, it should be appreciated that the opening 20 can vary in both size and shape.

The flexible container 10 further includes a patch 22 also having an opening 24. In one embodiment, the opening 24 in the patch 22 is similar in shape to the opening 20 in the first sidewall 12, that is, both are annular with the opening 24 in the patch 22 being smaller than the opening 20 in the first sidewall 12. It should also be appreciated that opening 24 in patch 22 can also very in size and shape.

Before the first sidewall 12 and second sidewall 14 are sealed together, the patch 22 is secured to the inner surface 26 of the first sidewall 12 so that at least portion 28 of the patch 22 overlaps opening 20 of the first sidewall 12. As illustrated in FIG. 1, when the patch 22 is secured to the inner surface 26 of the first sidewall 12, the opening 24 of the patch 22 is within the opening 20 of the first sidewall 12. The patch 22 is made of a thermoplastic material that can be secured to the inner surface 26 of the first sidewall 12 by means of heat sealing or a suitable adhesive. It should be appreciated that other embodiments of the present invention may not include such an opening 20 in the patch 22 when the container 10 is formed.

Figure 3:
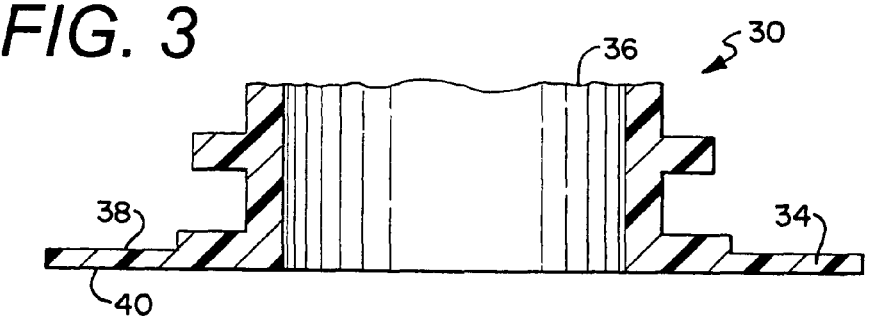
FIG. 3 is a cross sectional view of a fitment including a flange with a top and bottom surface.

Once the container 10 is formed, a fitment 30 can be attached to the outer surface 32 of the first sidewall 12. FIG. 3 illustrates one embodiment of the fitment 30. The fitment 30 includes a flange 34 and a spout 36. The flange 34 includes a top surface 38 and a bottom surface 40. The bottom surface 40 of the flange 34 is secured to the outer surface 32 of the first sidewall 12 and to the portion 28 of the patch 22 that is overlapping the opening 20 of the first sidewall 12. The fitment 30 can be attached to the sidewall 12 and the portion 28 of the patch 22 by either heat sealing or a suitable adhesive depending on the material from which the fitment 30 is made.

Figure 4:
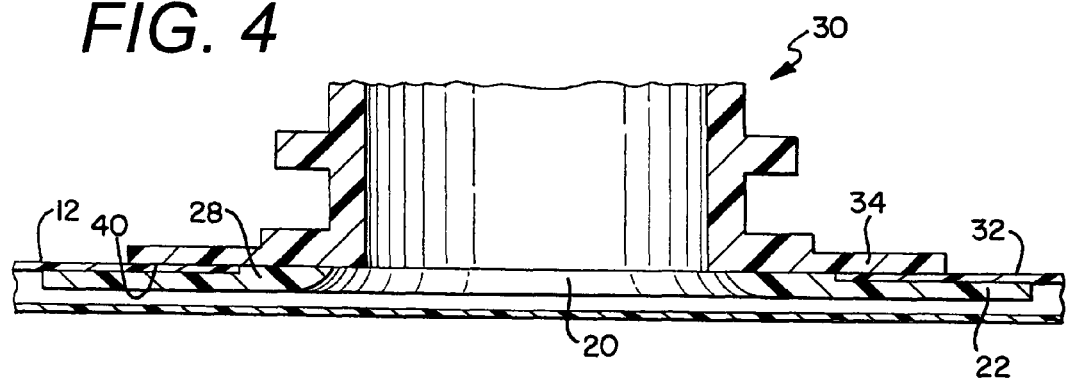
FIG. 4 is a cross sectional partial view of the flexible container having a fitment attached to an outer surface of a container wall and a portion of a patch which overlaps the opening of the container wall.

FIG. 4 illustrates the fitment 30 being secured to the outer surface 32 of the first sidewall 12 and the portion 28 of the patch 22.

Figure 5:
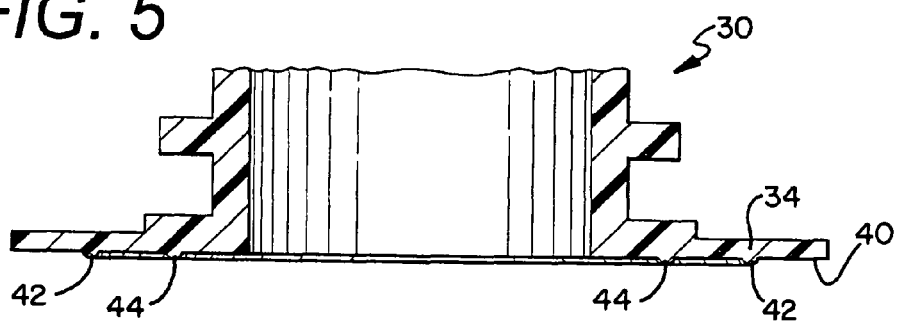
FIG. 5 is a cross sectional view of a fitment including a flange with a top and bottom surface, the bottom surface having two sealing beads.
Figure 6:
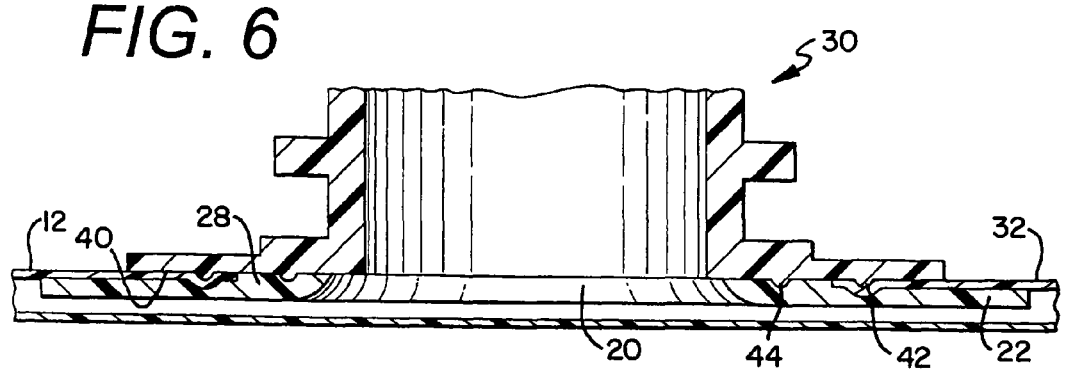
FIG. 6 is a cross sectional partial view of the flexible container having a fitment attached to an outer surface of a container wall and a portion of a patch which overlaps the opening of the container wall, the fitment also includes sealing beads on the bottom surface of its flange that are attached to the outer surface of the container wall and to the portion of the patch.

Another embodiment of the present invention includes the fitment 30 having at least one sealing bead 42 on the bottom surface 40 of the flange 34. The sealing beads 42, 44 provide a fluid tight seal around the opening 20 of the container 10. FIG. 5 provides an example of the fitment 30 having two sealing beads 42, 44. The sealing beads 42, 44 are bonded to both the outer surface 32 of the first sidewall 12 and to the portion 28 of the patch 22 that is overlapping the opening 20 of the first sidewall 12 as shown in FIG. 6. The sealing beads 42, 44 may be bonded either to the outer surface 32 of the first sidewall 12 or to just the portion 28 of the patch 22 that is overlapping the opening 20 of the first sidewall 12.

If the patch 22 is heat sealed either to the bottom surface 40 of the flange 34 of the fitment and/or to the sealing beads 42, 44 on the bottom surface of the flange, the patch 22 preferably consists of at least two layers which are laminated together. In one embodiment, the outer layer of the patch 22 or the layer to be heat sealed to the bottom surface 40 of flange 34 is made of polyethylene and the inner layer of the patch 22 is made of polyester.

Another embodiment of the present invention is shown in FIG. 7. That embodiment includes an annular skirt or lip 46 being formed in the opening 20 of the container 10. The annular skirt 46 is formed from the same material as the first sidewall 12. In this embodiment, the annular skirt 46 is formed from the first sidewall 12. However, other embodiments of the present invention include the annular skirts being of different material than the first sidewall 12 and/or being attached to the first sidewall 12.

FIG. 8 illustrates the annular skirt 46 being attached to the bottom surface 40 of the flange 34 of the fitment 30. The bottom surface 40 of the flange 34 is also attached to the outer surface 32 of the first sidewall 12. In that embodiment, one sealing bead 42 is bonded to the outer surface 32 of the first sidewall 12 and another sealing bead 44 is bonded to the annular skirt 46. As described above, the sealing beads can be bonded to either the annular skirt 46 alone or just the outer surface 32 of the first sidewall 12 depending on the application for which the container 10 is being used.

In some applications in which the container is used, it is important that no air or impurities enter into the container from the time it is manufactured to the time the container is filled. To ensure that no air or impurities enter into the bag, one embodiment of the present invention includes a step of applying an adhesive to the patch during the manufacturing of the container so that the sidewalls are temporarily secured together. During filling the force of the fluid will push the sidewalls apart allowing the container to be filled.

Another embodiment of the present invention is illustrated in FIG. 9. In that embodiment, to ensure that air or impurities do not enter into the container before it is filled, a patch 22 including a section 48 that is partially cut is attached to the first sidewall 12. When the patch 22 is secured to the first sidewall 12, the section 48 of the patch 22 which is partially cut will be within the opening. In this embodiment no air or impurities can enter the container 10 until it is filled. The section 48 of the patch 22 can be opened during filling of the container 10 by pressure from the fluid. The section 48 of the patch can also be opened when the fitment 30 is attached to the outside of the container 10. Other embodiments of the present invention do not include section 48 of patch 22 being partially cut but rather patch 22 that is punctured or an opening is formed before filling or when the fitment 30 is attached to the outside of the container 10.

While the specific embodiments have been illustrated and described, numerous modifications come to mind without significantly departing from the spirit of the invention, and the scope of protection is only limited by the scope of the accompanying Claims.

What is claimed is:

1. A method for forming a flexible container comprising the steps of:
   providing a first sidewall and a second sidewall, the first sidewall and the second sidewall each having an inner and an outer surface,
   providing an opening through the first sidewall;
   positioning a patch adjacent to the opening of the first sidewall, the patch also having an opening which is smaller than the opening of the first sidewall;
   securing the patch to the inner surface of the first sidewall so that the opening of the patch is within the opening of the first sidewall and applying an adhesive to the patch so that the second sidewall is temporarily secured to the patch; and
   sealing the first and second sidewalls together to form the container.

2. The method of claim 1 includes a step of attaching a bottom surface of a flange for a fitment to the outer surface of the first sidewall of the container and to a portion of the patch.

3. The method of claim 2 wherein the bottom surface of the flange includes at least one sealing bead to be bonded to outer surface of the first sidewall.

4. The method of claim 2 wherein the bottom surface of the flange includes at least one sealing bead to be bonded to the portion of the patch.

5. The method of claim 2 wherein the bottom surface of the flange includes at least one sealing bead to be bonded to the outer surface of the first sidewall and at least one sealing bead to be bonded to the portion of the patch.

6. The method of claim 2 which includes the step of filling the container.

7. A method for forming a flexible container comprising the steps of:
   providing a first sidewall and a second sidewall, the first sidewall and the second sidewall each having an inner and an outer surface,
   providing an opening through the first sidewall;
   attaching a patch to the inner surface of the first sidewall, the patch being sized and attached so that at least a portion of the patch overlaps the opening in the first sidewall;
   sealing the first and second sidewalls together to form the container;
   providing a fitment, the fitment having a flange with a top surface and a bottom surface; and
   attaching the bottom surface of the flange of the fitment to the outer surface of the first sidewall of the container and to the portion of the patch after the step of forming the container.

8. The method of claim 7 wherein the bottom surface of the flange further includes at least one sealing bead provided for bonding the flange to the outer surface of the first sidewall of the container.

9. The method of claim 8 wherein there are multiple sealing beads provided for bonding the flange to the outer surface of the first sidewall of the container.

10. The method of claim 8 wherein the sealing bead has an annular shape.

11. The method of claim 7 wherein the flange is heat sealed to the container.

12. The method of claim 7 which includes the step of filling the container.

13. The method of claim 7 which includes the step of forming an opening in the patch before the container is filled.

14. The method of claim 7 which includes the step of applying an adhesive to the patch so that the second sidewall is temporarily secured to the patch.

15. The method of claim 7 wherein the patch has a section that is partially cut through a thickness of the patch.

16. A method for forming a flexible container comprising the steps of:
    providing a first sidewall and a second sidewall, the first sidewall and the second sidewall each having an inner and an outer surface,
    providing an opening through the first sidewall;
    attaching a patch to the inner surface of the first sidewall, the patch being sized and attached so that at least a portion of the patch overlaps the opening in the first sidewall;
    sealing the first and second sidewalls together to form the container;
    providing a fitment, the fitment having a flange with a top surface and a bottom surface, the bottom surface of the flange having at least one sealing bead provided for bonding the flange to the portion of the patch; and
    attaching the bottom surface of the flange of the fitment to the outer surface of the first sidewall of the container and the portion of the patch after the step of forming the container.

17. The method of claim 16 which includes the step of filling the container.

18. The method of claim 16 wherein the sealing bead has an annular shape.

19. The method of claim 16 wherein there are multiple sealing beads for bonding the flange to the portion of the patch.

20. The method of claim 16 wherein the flange is heat sealed to the container.

21. The method of claim 16 which includes the step of forming an opening in the patch before the container is filled.

22. The method of claim 16 which includes the step of applying an adhesive to the patch so that the second sidewall is temporarily secured to the patch.

23. The method of claim 16 wherein the patch has a section that is partially cut through a thickness of the patch.

24. A method for forming a flexible container comprising the steps of:
    providing a first sidewall and a second sidewall, the first sidewall and the second sidewall each having an inner and an outer surface,
    providing an opening through the first sidewall;
    attaching a patch to the inner surface of the first sidewall, the patch being sized and attached so that at least a portion of the patch overlaps the opening in the first sidewall;
    sealing the first and second sidewalls together to form the container;
    providing a fitment, the fitment having a flange with a top surface and a bottom surface, the bottom surface of the flange having a first sealing bead provided for bonding the flange to the portion of the patch and a second sealing bead provided for bonding the flange to the outer surface of the first sidewall of the container; and
    attaching the bottom surface of the flange of the fitment to the outer surface of the first sidewall of the container and the portion of the patch after the step of forming the container.

25. The method of claim 24 which includes the step of filling the container.

26. The method of claim 24 wherein there are multiple sealing beads for bonding the flange to the outer surface of the first sidewall of the container.

27. The method of claim 24 where there are multiple sealing beads for bonding the flange to the portion of the patch.

28. The method of claim 24 where there are multiple sealing beads for bonding the flange to the outer surface of the first sidewall of the container and multiple sealing beads for bonding the flange to the portion of the patch.

29. The method of claim 24 which includes the step of applying an adhesive to the patch so that the second sidewall is temporarily secured to the patch.

30. The method of claim 24 which includes the step of forming an opening in the patch before the container is filled.

31. The method of claim 24 wherein the patch has a section that is partially cut through a thickness of the patch.

* * * * *